Jan. 20, 1970   P. N. NELSON   3,490,508
NUT OR BOLT RETAINER
Filed March 14, 1968

INVENTOR.
PERMIL N. NELSON
BY Edward C. Threedy
HIS ATTORNEY.

United States Patent Office 3,490,508
Patented Jan. 20, 1970

3,490,508
NUT OR BOLT RETAINER
Permil N. Nelson, Galesburg, Ill., assignor to Lynn H. Ewing, doing business as Blackhawk Company, Rock Island, Ill.
Filed Mar. 14, 1968, Ser. No. 713,185
Int. Cl. F16b 39/02
U.S. Cl. 151—41.74        1 Claim

ABSTRACT OF THE DISCLOSURE

A nut or bolt retainer in the form of an elongated substantially rigid plate buckled from its longitudinal axis to form a bow and of a length to span between adjacent heads of a spaced bolt or nut thereof, whereby upon the application of force to the bow, the bow is displaced from one side of such axis to the other, wedging the plate between and against the bolt heads or nuts to firmly retain the bolts or nuts in their respective threaded position.

SMUMARY OF THE INVENTION

This invention relates to the art of bolt or nut retainers. Prior to my invention, it was the practice to place upon the shank of a bolt, beneath the head thereof, a washer termed in the art a "lock washer." In carrying out my invention, I contemplate utilizing adjacent bolt heads or nuts of a bolt to wedge therebetween and thereagainst an elongated buckled plate of substantially rigid material, to retain the bolt or nut thereof in its respective threaded position.

DESCRIPTION

The invention will be best understood by reference to the accompanying drawing, wherein the preferred form of construction is shown. In such drawings.

Figure 1:
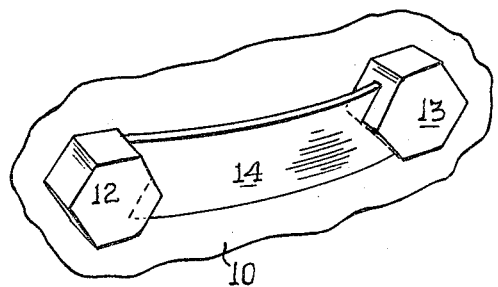
FIG. 1 is a perspective view showing the invention in applied position with respect to a pair of adjacent bolt heads.
Figure 2:
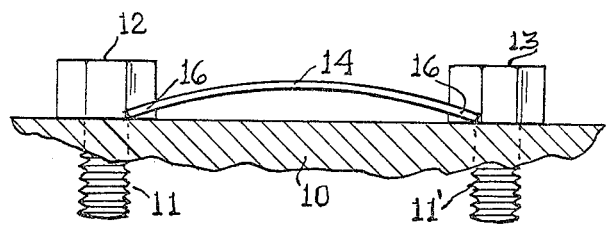
FIG. 2 is a longitudinal sectional detail view of the same showing the bowed portion of the bolt retainer extending in an outward direction with respect to the structure to which the bolts are threadably connected.
Figure 3:
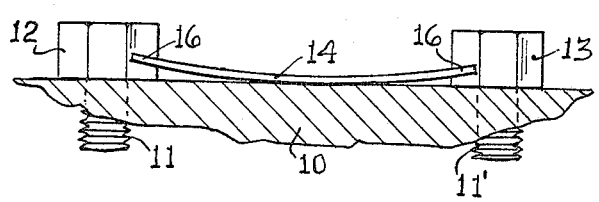
FIG. 3 is a view similar to that shown in FIG. 2, but showing the bowed portion of the bolt retainer forced against the structure to which the bolts are threadably connected.

In FIGS. 1 to 3 inclusive of the drawings, 10 indicates a structure to which adjacent bolts 11 and 11' are threadably connected. The bolts 11 and 11' have integral bolt heads 12 and 13 formed therein. In practical use, each bolt 11 or 11' in lieu of the heads 12 or 13 may have threaded thereon a nut.

Figure 4:
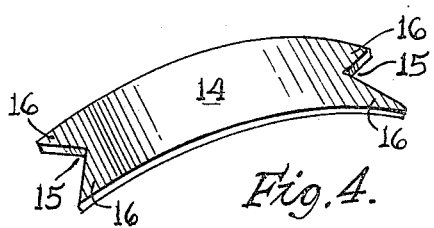
FIG. 4 is a perspective view of the retainer plate.

The retainer as illustrated in FIG. 4 and as shown in FIGS. 1 to 3 inclusive, is in the form of an elongated plate 14 formed of substantially rigid material and buckled or bowed between its opposite ends.

In the form shown in FIGS. 1 to 4 inclusive, the plate 14 has formed in its opposite end portions substantially V-shaped notches 15 to provide fork-like end portions 16.

While the plate 14 is formed of substantially rigid material, it is capable of being bent under the application of force, to change the position of the bowed portion from one side of the long axis of the plate to the other side of such axis. This is accomplished after the plate is positioned between the adjacent bolt head or nut, with the head or nut located in the respective V-shaped notch of the plate. When in this position, the bowed portion of the plate is sharply struck by a hammer or other tool whereby the bow of the plate is transferred across the long axis of the plate, rigidly forcing the fork-like end portions 16 into gripping engagement with the adjacent bolt head or nut.

To remove the retainer plate 14, it is only necessary to insert the tip of a screw driver or other instrument beneath the bow as seen in FIG. 3, and by exerting pressure against the plate 14 the plate will become disengaged from between the adjacent bolt heads or nuts.

Figure 5:
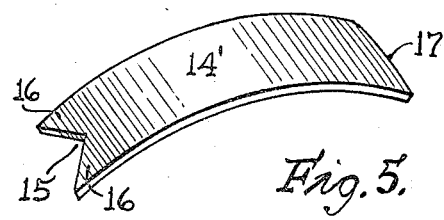
FIG. 5 is a perspective view similar to that shown in FIG. 4, but showing a modified form of structure.

The form shown in FIG. 5 is the same as that shown in FIG. 4, except that only one end 17 of the plate 14' is notched. The use and application of the plate 14' is the same as that of the plate 14.

Figure 6:
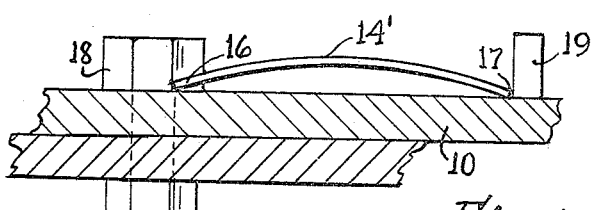
FIG. 6 is a longitudinal sectional detail view of the retainer plate shown in FIG. 5, in an applied position.

In FIG. 6, I have shown the plate 14' applied between a bolt nut 18 and a fixed stud 19.

The plate 14 provides a simple bolt and nut retainer which can be quickly and conveniently applied and removed.

While I have illustrated and described the preferred form of construction for carrying my invention into effect, this is capable of variation and modification.

Having thus described my invention, what I claim as new and desire to protect by Letters Patent is:

1. A bolt retainer for locking the enlarged heads of nuts and bolts against rotation wherein the improvement comprises:
    (a) an elongated substantially rigid plate pre-bowed in the direction of its length,
    (b) said plate having V notches formed in its opposite ends to provide fork-like bolt-head engaging end portions,
    (c) said pre-bowed plate having a length equal to the distance between spaced apart bolt heads so as to be placed in a convex position therebetween with said V notches in contact with said confronting edges of the enlarged heads of the bolts,
    (d) said plate being forcibly flexed transversely through its longitudinal length about the points of contact between said V-notched ends and the bolt heads into a concave position having a radius less than its pre-bowed convex position with its length slightly greater than the distance between the enlarged bolt heads so as to wedge said plate therebetween and to lock the same against rotation.

References Cited

UNITED STATES PATENTS

| 247,487 | 9/1881 | Doray | 151—54 |
| 312,555 | 2/1885 | Crocker | 151—55 |
| 366,436 | 7/1887 | Sylvester | 151—54 |
| 720,769 | 2/1903 | Woodworth | 151—55 |
| 2,795,261 | 6/1957 | Kustusch | 151—41.74 |

FOREIGN PATENTS 791,163  2/1958  Great Britain.

MARION PARSONS, Jr., Primary Examiner

U.S. Cl. X.R.
155—55